United States Patent Office 2,763,085
Patented Sept. 18, 1956

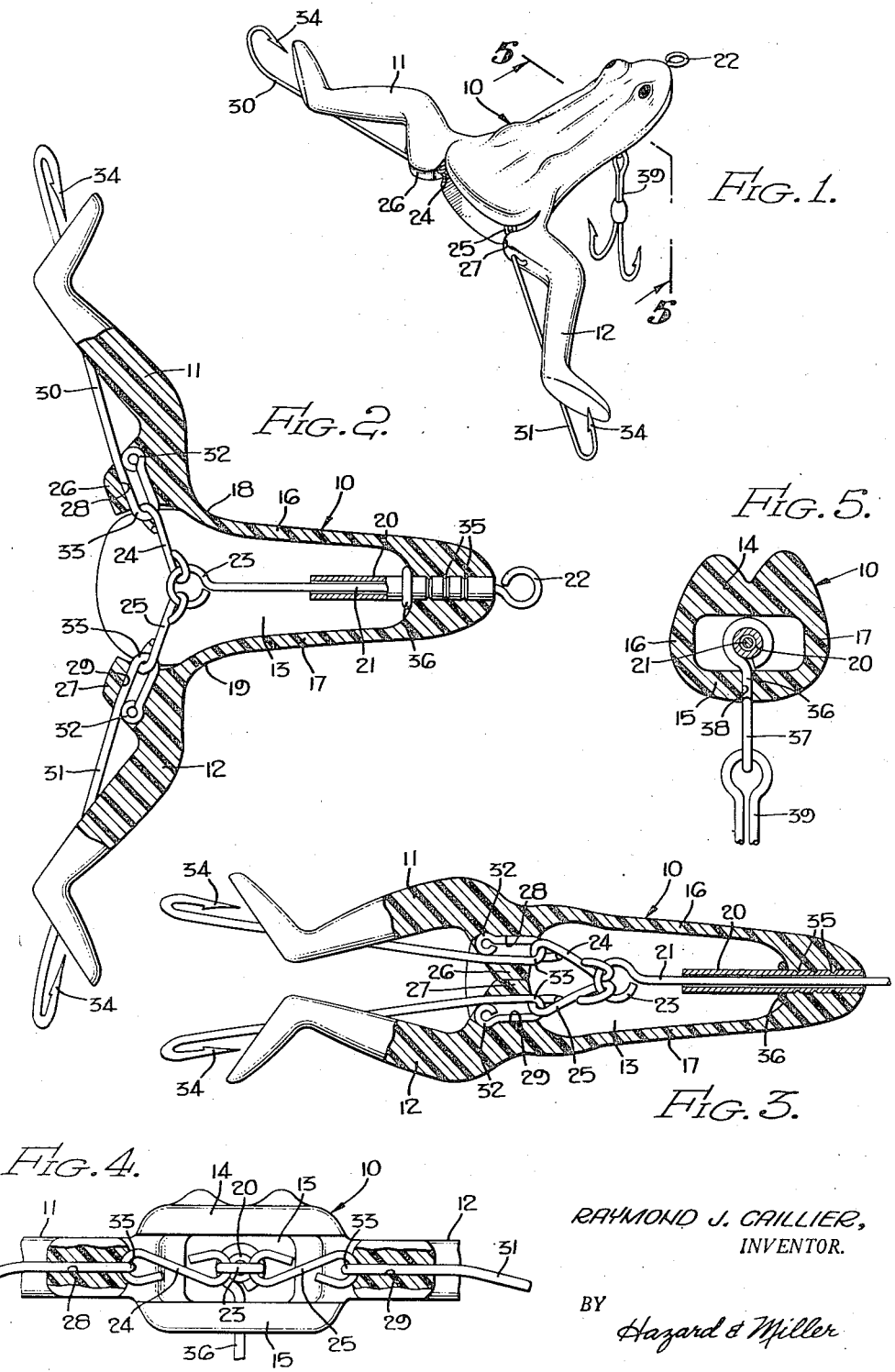

2,763,085

ANIMATED FISH LURE

Raymond J. Caillier, San Pedro, Calif.

Application January 10, 1955, Serial No. 480,974

2 Claims. (Cl. 43—42.02)

This invention relates to improvements in fish lures.

An object of the invention is to provide an improved fish lure consisting of an elongated body simulating a natural bait and which has one or more limb portions swingably and resiliently mounted thereon adapted to assume normal positions extending laterally from the body. An actuating means is longitudinally mounted on the body and is adapted to be connected to a fishing line. This actuating means, in turn, is connected to the limb portions so that when tensions imposed on the fishing line in the course of trolling the body through the water exceed a predetermined degree, the limb portions will be caused to swing relatively to the body in a life-like manner. In this way in the course of trolling the body through the water and successively jerking on the fishing line the limb portions can be actuated in life-like manner and thus excite and attract fish.

Another object of the invention is to provide an improved fish lure which can be easily manufactured and the parts of which are capable of being easily and quickly assembled.

Still a further object of the invention is to provide a fish lure having movable parts which are relatively few in number and which will not readily become damaged or get out of working condition.

With the foregoing and other objects in view, which will be made manifest in the following detailed description and specifically pointed out in the appended claims, reference is had to the accompanying drawing for an illustrative embodiment of the invention, wherein:

Figure 1 is a perspective view of the improved fish lure embodying the present invention;

Fig. 2 is a top plan view of the same, parts being broken away and shown in horizontal section, the elements of the fish lure being shown in their normal position;

Fig. 3 is a view similar to Fig. 2, but illustrating the fish lure in its abnormal or other extreme position;

Fig. 4 is a rear view in elevation of the fish lure, parts being broken away and shown in vertical section; and Fig. 5 is a sectional view taken substantially upon the line 5—5 upon Fig. 1.

Referring to the accompanying drawing wherein similar reference characters designate similar parts throughout, the improved fish lure comprises an elongated body generally indicated at 10. This body is shaped to conform generally to a natural bait, and for simplification I have illustrated the body as being shaped and decorated to simulate or represent a frog.

At the rear end of this body there are laterally extending limb portions 11 and 12, which in the illustration given are shaped to generally conform to the frog's hind legs. The body 10 and the legs 11 and 12 are preferably molded either of rubber or a rubber-like material, such as, for example, any one of the resilient synthetic resinous plastics.

In the body there is formed a cavity 13 which extends from the rear of the body forwardly to a point near the forward end thereof. This cavity, in effect, divides the body so that it has a top 14, a bottom 15, and sides 16 and 17. The leg portions 11 and 12 are connected to the rear ends of the sides 16 and 17, but are preferably unconnected otherwise to the top 14 or to the bottom 15.

At the junctures between the sides 16 and 17 and the leg portions 11 and 12, the side walls may be made slightly thinner and readily flexible near the portions indicated at 18 and 19. In this manner the leg portions 11 and 12 are, in effect, hingedly or swingably mounted on the rear end of the body so that they may optionally assume a normal position extending laterally with respect to the body as depicted in Fig. 2 or a contracted or collapsed position generally, in line with the length of the body, as depicted in Fig. 3.

The axis of swing of each of the legs is disposed offset with respect to the center line of the body and is at the approximate locations indicated at 18 and 19, respectively. Due to the resiliency of the material from which the body is formed, the legs are normally and yieldably urged into the position shown in Fig. 2, but can be forced into the position shown in Fig. 3, as will be hereinafter explained.

When the legs are released they automatically tend to return to the position shown in Fig. 2. In the forward end of the body or that portion which may be regarded as the nose thereof, there is disposed a sleeve or bushing 20 in which is slidable in a longitudinal direction an actuating wire 21. The forward end of this actuating wire is bent into the form of an eye 22, or the equivalent, by which the actuating wire can be connected to a fishing leader and to a fishing line. The rear end of the actuating wire is also bent into the form of an eye 23, and wire links 24 and 25 are connected thereto so as to be, in effect, swingably mounted thereon. These links extend toward the legs 11 and 12, respectively.

Portions of the legs 11 and 12 adjacent the hinge locations 18 and 19 are thickened, as indicated at 26 and 27, and these thickened portions may be regarded as thigh portions on the legs. In these portions there are formed narrow openings 28 and 29 in which relatively rigid shanks are disposed. In the form illustrated, I take conventional fishhooks 30 and 31 equipped with eyes 32 on the ends of their shanks and I reversely bend the shanks adjacent the eyes, as indicated at 33, so as to provide loops through which the ends of the links 24 and 25 may be extended. The reversely bent portions of the shanks are partially thrust into the openings 28 and 29, and are thus, in effect, rigidly mounted on the leg portions and serve to control their movements. The barbed pointed ends of the hooks indicated at 34 are thus disposed in spaced relation to and preferably slightly above the tops of the ends of the legs. The reverse bends 33 are thus disposed offset and rearwardly of the hinge axes 18 and 19. Considered as viewed in Fig. 3, the reverse bends 33 are disposed inwardly of and to the rear of the hinge axes 18 and 19.

The sleeve or bushing 20 is anchored in place within the nose of the body by being externally kerfed or grooved, as indicated at 35 and, in addition thereto, this sleeve or bushing has a short length of wire 36 bent about the sleeve and soldered or otherwise secured thereto. The lower end of this short length of wire is bent to provide an eye 37, which extends through an aperture or opening 38 in the bottom 15 of the body.

In assembling the sleeve 20 with the body, the sleeve is merely forced into an opening in the nose of the body and in so doing, the bottom of the body is flexed downwardly until the eye 37 is disposed opposite the opening 38. When this location is reached, the body merely returns to normal position with the eye 37 extending downwardly therebeneath. The eye 37 may serve to suspend a hook 39.

It will be appreciated from the above-described construction that as the lure is towed or trolled through the water that if the tension on the fishing line is relatively weak that the legs 11 and 12 will remain distended or in the position shown in Fig. 2. However, if the line is jerked so as to increase the tension, this tension is transmitted through the actuating wire 21 to the links 24 and 25 and to the hooks 30 and 31. The arrangement of these hooks is such that when this high tension is imposed the legs will be drawn inwardly and to the position shown in Fig. 3. Subsequently, if the line is slightly released the reduction in tension enables the resiliency of the body material to return the legs from the position shown in Fig. 3 to the position shown in Fig. 2. In this manner, the lure, although artificial in character, will simulate the motions of a live frog swimming in the water and, thus, attract fish thereto.

While the shape of the lure as herein depicted represents one form of natural bait, such as a frog, it will be appreciated that it may be given other shapes. For example, it may be given the shape of a squid wherein one or more arms at the rear of the body are connected to the actuating wire 21 in a similar manner so that tensions created by jerking the line will cause these arms to move back and forth in a manner simulating the movement of the corresponding portions on a natural squid in the course of swimming.

It will be appreciated from the above-described construction that the improved fish lure is highly advantageous in that it may be caused to simulate life-like movements in the water by the mere jerking of the fishing line.

The construction is relatively simple and the parts thereof are capable of easily and quickly being assembled together.

Various changes may be made in the details of construction without departing from the spirit and scope of the invention as defined by the appended claims.

I claim:

1. A fishing lure comprising a hollow body formed of resilient material, said body having a cavity therein extending forwardly from the rear of the body and defining thereon a top, bottom, and sides behind a forward nose, limb portions integrally, resiliently, and swingably connected to the rear portions of the sides, an actuating member slidably mounted on the body and adapted to be connected to a fishing line, shanks mounted on the limb portions, and links pivotally connected to the shanks and to the actuating member whereby tensions applied to the fishing line in excess of a predetermined degree will cause the limb portions to swing towards each other and upon release of tension the inherent resilience of the limb portions will cause them to expand and assume laterally extending normal positions with respect to the body and to cause the actuating member to slide to its retracted position within the body.

2. A fishing lure comprising a hollow body formed of resilient material, said body having a cavity therein extending forwardly from the rear thereof and defined by a top, bottom and sides located behind a forward nose, resilient limb portions integrally, resiliently and swingably connected to the rear portions of the sides, an actuating member slidably mounted on the body and adapted to be connected to a fishing line, the limb portions adjacent their points of connection with the body, having narrow openings therethrough, the inner ends of the openings being directed toward the interior of the hollow body, a fish hook for each limb having its shank in one of said narrow openings and gripped by the resilient material of each limb, and links pivotally connected between a rearward portion of the actuating member and each of the shank portions of the fish hooks.

References Cited in the file of this patent

UNITED STATES PATENTS

| | | |
|---|---|---|
| 803,134 | Rhodes | Oct. 31, 1905 |
| 824,817 | Rhodes | July 3, 1906 |
| 841,911 | Burthe | Nov. 30, 1909 |
| 2,491,846 | Boekenoogen et al. | Dec. 20, 1949 |
| 2,504,229 | Sinclair | Apr. 18, 1950 |
| 2,534,482 | Terhorst | Dec. 19, 1950 |